미국 특허 US 8,670,089 B2

(12) United States Patent
Hung et al.

(10) Patent No.: US 8,670,089 B2
(45) Date of Patent: Mar. 11, 2014

(54) DISPLAY DEVICE, MANUFACTURING METHOD THEREOF, AND COLOR ADJUSTING METHOD USED THEREON

(75) Inventors: Chun-Chang Hung, Hsin-Chu (TW); Shui-Chih Lien, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 1125 days.

(21) Appl. No.: 12/635,317

(22) Filed: Dec. 10, 2009

(65) Prior Publication Data

US 2010/0188615 A1    Jul. 29, 2010

(30) Foreign Application Priority Data

Jan. 23, 2009    (TW) ................................ 98102997 A

(51) Int. Cl.
*G02F 1/1335*    (2006.01)
(52) U.S. Cl.
USPC .................................. 349/71; 349/70; 349/69
(58) Field of Classification Search
USPC .............................................. 349/69, 70, 71
See application file for complete search history.

(56) References Cited

U.S. PATENT DOCUMENTS

| | | | |
|---|---|---|---|
| 5,530,489 A * | 6/1996 | Henderson et al. | ........... 348/757 |
| 5,666,174 A | 9/1997 | Cupolo, III | |
| 6,417,899 B1 | 7/2002 | Jones et al. | |
| 6,469,755 B1 * | 10/2002 | Adachi et al. | .................... 349/62 |
| 6,765,634 B2 * | 7/2004 | Horibe et al. | .................... 349/70 |
| 6,844,903 B2 | 1/2005 | Mueller-Mach et al. | |
| 7,248,310 B2 | 7/2007 | Mueller-Mach et al. | |
| 7,667,799 B2 | 2/2010 | Kuo et al. | |
| 2004/0201795 A1 | 10/2004 | Paukshto | |
| 2006/0274226 A1 * | 12/2006 | Im et al. | ........................... 349/71 |
| 2008/0074583 A1 * | 3/2008 | Li et al. | ........................... 349/71 |

FOREIGN PATENT DOCUMENTS

| | | |
|---|---|---|
| CN | 1540412 | 10/2004 |
| EP | 0 887 692 | 12/1998 |
| JP | 2008-90298 | 4/2008 |
| TW | 556026 | 10/2003 |
| TW | 200846767 | 12/2008 |

OTHER PUBLICATIONS

Chinese language office action dated Jan. 3, 2010.
English language translation of abstract and pertinent parts of CN 1540412 (published Oct. 27, 2004).
Taiwan office action dated Feb. 25, 2013.

* cited by examiner

*Primary Examiner* — Lucy Chien
(74) *Attorney, Agent, or Firm* — McClure, Qualey & Rodack, LLP

(57) ABSTRACT

A display device, a manufacturing method thereof, and a color adjusting method used thereon are provided. The display device includes a blue light source and a display panel which includes a substrate having a color adjusting layer, a blue filter layer, and an inner polarizer disposed thereon. The color adjusting layer includes a plurality of color excitation units, wherein each color excitation unit contains a plurality of wavelength transformation materials. The blue filter layer allows only blue light to pass therethrough and absorbs other color light. The blue light passes through the inner polarizer and the blue filter layer to reach the color excitation units. The blue light further excites the wavelength transformation materials to generate different color light. A part of the different color light is transmitted to and absorbed by the blue filter layer.

19 Claims, 8 Drawing Sheets

DISPLAY DEVICE, MANUFACTURING METHOD THEREOF, AND COLOR ADJUSTING METHOD USED THEREON

This application claims the priority based on a Taiwanese Patent Application No. 098102997, filed on Jan. 23, 2009, the disclosure of which is incorporated herein by reference in its entirety.

BACKGROUND OF THE INVENTION

1. Field of the Invention

The present invention relates to a display device, a manufacturing method thereof, and a color adjusting method used thereon; more particularly, the present invention relates to a liquid crystal display device, a manufacturing method thereof, and a color adjusting method used thereon.

2. Description of the Prior Art

With the progress of technology, the manufacture technology of flat display device becomes more and more mature. Consequently, the production line and the new product line for flat display device, such as liquid crystal display, organic light emitting diode, etc., are continuously developed. Since the applications of flat display device widely expand, flat display devices are expected to have better display performance to meet diverse product requirements. In other words, the display performance of flat display device, such as brightness and viewing angle, must meet more stringent standards to catch up with the future trend of display device.

For a conventional liquid crystal display device, FIG. 1 exemplarily shows the liquid crystal display device including a backlight module 10 and a display panel 30. The backlight module 10 includes a white light source 11 which is disposed under the display panel 30 and configured to emit white light facing the display panel 30. The display panel 30 includes a lower substrate 31, an upper substrate 33, and a liquid crystal layer 35 sandwiched between the lower and upper substrates 31, 33. A first polarizer layer 51 is disposed outwardly from the lower substrate 31, and a second polarizer layer 52 is disposed outwardly from the upper substrate 33. A color filter layer 60 consisting of red filter units 61, green filter units 63, and blue filter units 63 is disposed inwardly from the upper substrate 33.

The white light reaches the display panel 30 through the first polarizer layer 51 and the lower substrate 31 into the liquid crystal layer 35 and then to the color filter layer 60 after twisted by the liquid crystal layer 35. The red filter unit 61, the green filter unit 63, and the blue filter unit 65 respectively allow a specific portion of light to pass therethrough and block other portions, so that the lights passing therethrough have a respective color, such as red, green, and blue. Finally, the light passes through the upper substrate 33 to emit out while the second polarizer layer 52 controls the amount of emitted light.

In such a conventional configuration, since the color filter layer 60 will block most of light, for example, the red filter unit 61 allows only red light to pass therethrough and blocks other color lights, the amount of light is greatly decreased after passing through the red filter unit 61. Moreover, the brightness at larger viewing angle is also not satisfactory.

SUMMARY OF THE INVENTION

An objective of the present invention is to provide a display device with enhanced brightness.

Another objective of the present invention is to a provide display device with larger viewing angle.

Another objective of the present invention is to provide a manufacturing method of the display device and a color adjusting method to enhance the brightness of output image.

Another objective of the present invention is to provide a manufacturing method of the display device and a color adjusting method to increase the viewing angle of output image.

A display device of the present invention includes a blue light source and a display panel. The display panel is disposed on the blue light source to receive blue light emitted from the blue light source. The display panel includes a first substrate, a second substrate, and a liquid crystal layer. The liquid crystal layer is sandwiched between the first substrate and the second substrate. The first substrate has a color adjusting layer, a blue filter layer, and a polarizer layer formed thereon. The color adjusting layer is located on the first substrate facing the blue light source and the second substrate and includes a plurality of color excitation units. Each color excitation unit includes a plurality of wavelength transformation materials. When the blue light enters the color excitation units, the wavelength transformation materials are excited to generate non-blue light, i.e. light of color other than blue.

The blue filter layer is formed on the color adjusting layer facing the blue light source and the liquid crystal layer. The blue filter layer allows only blue light to pass therethrough and absorbs non-blue light. The blue light initially enters from the liquid crystal layer to the blue filter layer through the polarizer layer, then to the color adjusting layer and into the color excitation units. The blue light entering into the color excitation units will excite the wavelength transformation materials to generate different color of light, such as red light or green light. Since the excited wavelength transformation materials radiatively emit non-directional light, part of the generated non-blue light is transmitted to the first substrate, and another part is transmitted to the blue filter layer. The part of non-blue light such as red light and green light reaching the blue filter layer will be absorbed by the blue filter layer to reduce the performance of other color in the color adjusting layer and reduce the impact on optical behavior of the liquid crystal layer.

A manufacturing method of a display device includes: forming a color adjusting layer on a first substrate; forming a blue filter layer on the color adjusting layer opposite to the first substrate; forming a polarizer layer on the blue filter layer opposite to the color adjusting layer; and disposing a blue light source for generating a blue light. The blue light reaches the color adjusting layer through the polarizer layer and the blue filter layer. Part of the blue light enters color excitation units of the color adjusting layer to excite the wavelength transformation materials to generate non-blue light, and another part of the blue light emits out from the blue light unit. Part of the non-blue light generated from the excited wavelength transformation materials emits out from a direction opposite to the blue filter layer, and another part emits toward the blue filter layer and absorbed by the blue filter layer.

DETAILED DESCRIPTION OF THE PREFERRED EMBODIMENT

Figure 1:
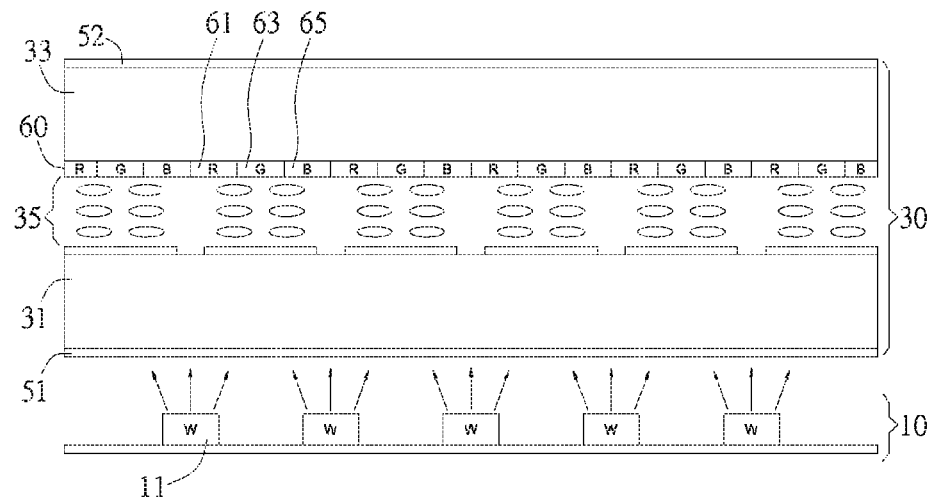
FIG. 1 illustrates a schematic cross-sectional view of a conventional liquid crystal display device.
Figure 2:
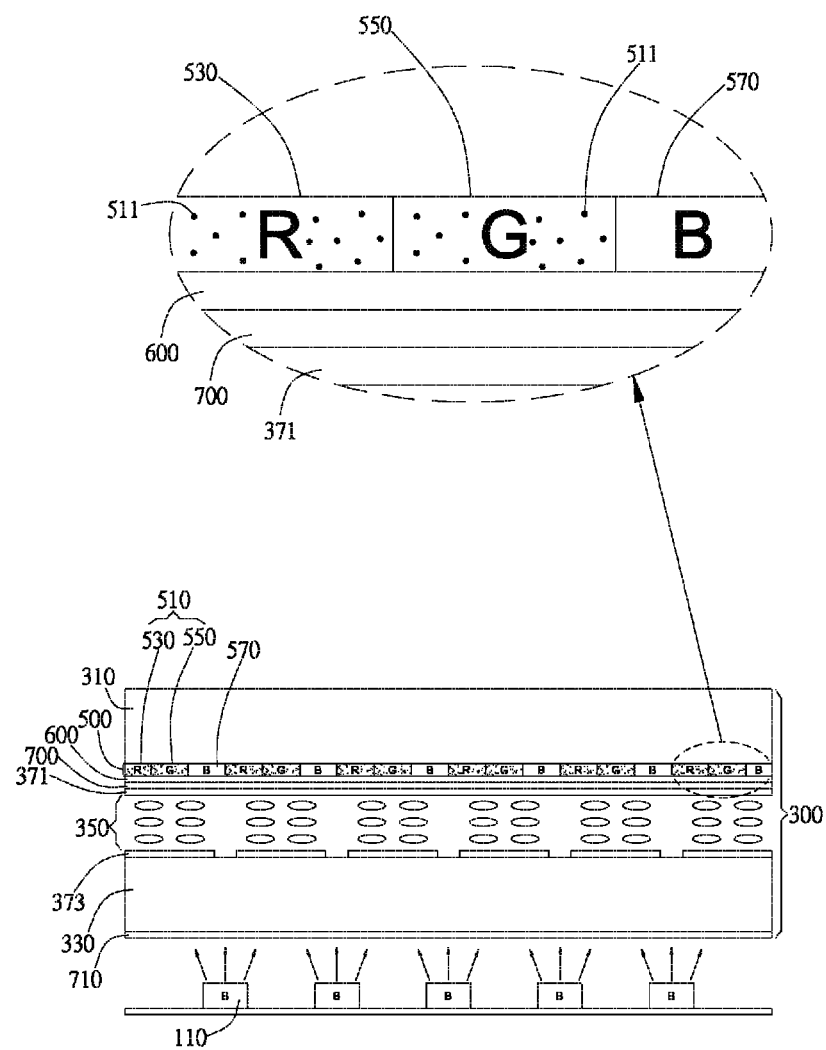
FIG. 2 illustrates a schematic cross-sectional view of a display device of the present invention.

The present invention provides a display device, a manufacturing method thereof, and a color adjusting method used thereon. In a preferred embodiment, the display device includes a liquid crystal display device, such as liquid crystal display televisions, liquid crystal display monitors of personal computers and laptop computers, and liquid crystal display screens of mobile phones and digital cameras. In the embodiment of FIG. 2, the display device preferably includes a blue light source 110 and a display panel 300. In this embodiment, the blue light source 110 is composed of blue light emitting diodes. However, in other embodiments, the blue light source 110 can be other type of light sources. The display panel 300 is disposed on the blue light source 110 to receive blue light emitted from the blue light source 110. As shown in FIG. 2, the display panel 300 includes a first substrate 310, a second substrate 330, and a liquid crystal layer 350. In this embodiment, the first substrate 310 is a substrate on the display side, and the second substrate 330 is a substrate on the light source side. The liquid crystal layer 350 is sandwiched between the first substrate 310 and the second substrate 330. The blue light emitted from the blue light source 110 enters the display panel 300 from the second substrate 330 and is transmitted through the crystal layer 350 then reaching the first substrate 310.

As shown in FIG. 2, the first substrate 310 has a color adjusting layer 500, a blue filter layer 600, and a polarizer 700 formed thereon. The color adjusting layer 500 is located on the first substrate 310 facing the blue light source 110 and the second substrate 330. The color adjusting layer 500 includes a plurality of color excitation units 510. Each color excitation unit 510 includes a plurality of wavelength transformation materials 511. When the blue light enters the color excitation units 510, the wavelength transformation materials will be excited to generate non-blue light, i.e. light of color other than blue. For example, the wavelength transformation materials 511 can be phosphor particles, which can be embodied to generate any desired color light. In this embodiment, the color excitation units 510 are mainly divided into red light units 530 and green light units 550. The red light unit 530 includes a plurality of red phosphor particles, such as phosphor particles containing europium compound or calcium sulfide. The green light unit 550 includes a plurality of green phosphor particles, such as phosphor particles containing silicates, $Ba_2SiO_4$, or other components. The red phosphor particle is excited by the blue light to generate red light, and the green phosphor particle is excited by the blue light to generate green light. In other words, the blue light entering the red light unit 530 is converted into red light, and the blue light entering the green light unit 550 is converted into green light. Compared to the conventional color filter, the blue light entering the color excitation units 510 is substantially totally converted into red light or green light, instead of using the conventional color filter to block non-red light or non-green light. Accordingly, the converted light has less or no decrease in amount.

As shown in FIG. 2, the color adjusting layer 500 further includes a plurality of blue light units 570. The blue light units 570 and other color excitation units 510 are disposed side by side to form the color adjusting layer 500. The blue light unit 570 is preferably made of material transparent to light and with no effect on the color tone of blue light. However, in other embodiment, the blue light unit 570 may also have light adjusting function for adjusting such as color temperature, chromaticity, or other light characteristics. In this embodiment, the blue light unit 570, the red light unit 530, and the green light unit 550 are arranged in a predetermined order. Each pixel of the display panel 300 includes one red light unit 530, one green light unit 550, and one blue light unit 570. To adjust the amount of output light from the three primary color units in one pixel, the light outputted from the pixel can have a desirable color. In this embodiment, the blue light unit 570 allows blue light to pass therethrough. In other words, regardless of loss, the blue light emitted from the blue light source 110 will not be blocked by the blue light units 570 after passing through the liquid crystal layer 350 and substantially totally emit out from the blue light units 570.

As shown in FIG. 2, the blue filter layer 600 is formed on the color adjusting layer 500 facing the blue light source 110 and the liquid crystal layer 350. In view of the optical property, the blue filter layer 600 allows only blue light to pass therethrough and absorbs non-blue light. This optical property is preferably commonly applicable to lights from two opposite directions, one from the liquid crystal layer 350 into the blue filter layer 600 and the other from the color adjusting layer 500 into the blue filter layer 600. Furthermore, the pass of blue light and the absorption of non-blue light are performed regardless of the traveling angle of light. In a preferred embodiment, the blue filter layer 600 is a material containing Phthalocyanine pigment. However, in other embodiment, the blue filter layer 600 can be polymer, monomer, solvent, pigment, light initiator, etc. Moreover, the blue filter layer 600 is preferably formed on the color adjusting layer 500 by a single coating process or a deposition process.

Figure 3:
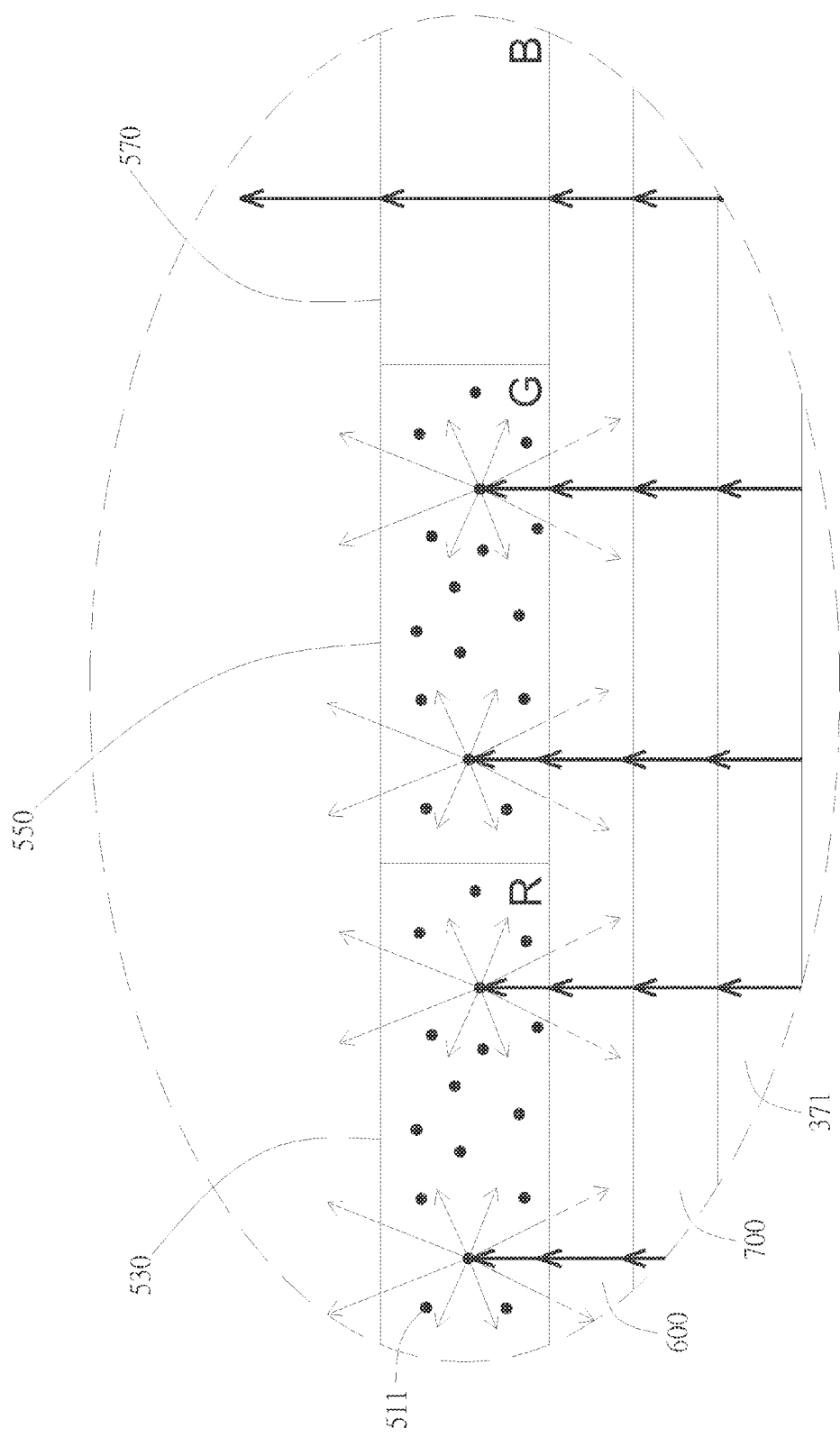
FIG. 3 is a schematic view illustrating the optical behavior of the embodiment of FIG. 2.

In view of the optical property, as shown in FIG. 3, the blue light is initially emitted into the blue filter layer 600 from the liquid crystal layer 350. Since the blue filter layer 600 does not block the blue light, the intensity and amount of blue light passing through the blue filter layer 600 will not be affected. After passing through the blue filter layer 600, the blue light reaches the color adjusting layer 500 and enters the color excitation units and the blue light units 570, respectively. The blue light entering the blue light units 570 is emitted out without any color adjustment. The blue light entering the color excitation units 510 will excite the wavelength transformation materials 511 to generate light of different color. For example, the red light unit 530 can generate red light, and the green light unit 550 can generate green light. However, as shown in FIG. 3, since the excited wavelength transformation material (e.g. phosphor particles) 511 radiatively emit non-directional light, part of the generated light is transmitted to the first substrate 310, and another part is transmitted to the blue filter layer 600. When the red light and the green light reach the blue filter layer 600, they are absorbed by the blue filter layer 600 to reduce the performance of other color in the color adjusting layer 500 and reduce the impact on optical behavior of the liquid crystal layer 350.

As shown in FIG. 2 and FIG. 3, the polarizer layer 700 (also referred as inner polarizer layer) is formed on the blue filter layer 600 facing the blue light source 110 and the liquid crystal layer 350. In this embodiment, a first polarizer layer 710 is formed on the outer side of the second substrate 330 so that the liquid crystal layer 350 is sandwiched between the polarizer layer 700 and the first polarizer layer 710. However, in other embodiment, the first polarizer layer 710 can be disposed on the inner side of the second substrate 330. Furthermore, in a preferred embodiment, the polarization directions of the polarizer layer 700 and the first polarizer layer 710 are perpendicular to each other. After the blue light passes through the first polarizer layer 710, the blue light is polarized to become linear polarized light with polarization direction twisted by the arrangement of liquid crystal molecules in the liquid crystal layer 350, and then emitted out from the polarizer layer 700, which serves as a second polarizer layer. In other words, when applying voltage on the liquid crystal layer 350 to change the arrangement of liquid crystal molecules, the polarization direction of the blue light can be simultaneously changed in turn to control the amount of light emitted from the polarizer layer 700. Since the blue light reaching the color adjusting layer 500 will loss its polarity due to the wavelength transformation materials 511 in the color excitation units, the polarizer layer 700 must be disposed between the color adjusting layer 500 and the liquid crystal layer 350 so that the amount of output light can be controlled by varying the voltage applied to the liquid crystal layer 350.

As shown in FIG. 2 and FIG. 3, a common electrode 371 is formed on the polarizer layer 700 facing the liquid crystal layer 350, and a pixel electrode 373 is formed on the inner side of the second substrate 330. By controlling the potential difference between the pixel electrode 373 and the common electrode 371, the arrangement and the twist behavior of liquid crystal molecules in the liquid crystal layer 350 can be adjusted.

Figure 4:
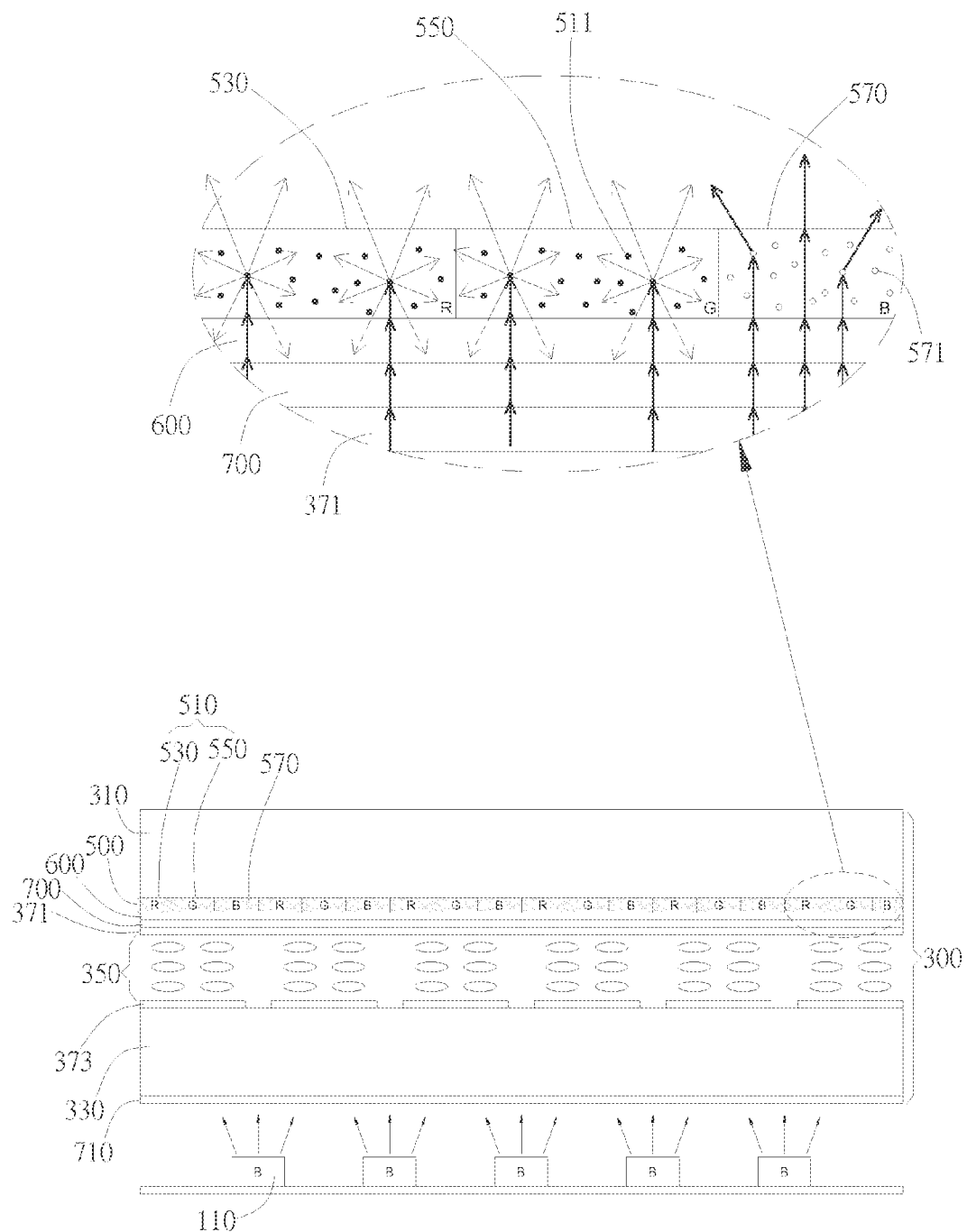
FIG. 4 is a schematic cross-sectional view of a blue light unit having diffusion particles in accordance with an embodiment of the present invention.

FIG. 4 is another embodiment of the present invention. In this embodiment, the blue light unit 570 includes a plurality of diffusion particles 571. The diffusion particles are preferably doped within the light-transparent material of the blue light unit 570 before forming the blue light unit 570, and then the blue light unit 570 is formed by coating or other processes. When the blue light enters the blue light unit 570, part of the blue light will be reflected by the diffusion particles 571 to change the traveling direction, so that the angle of the blue light emitted from the blue light unit 570 becomes diverse. In other words, such a feature can ensure a certain amount of output light at larger viewing angle.

Furthermore, since the color excitation units 510 disposed side by side with the blue light units 570 all contain wavelength transformation materials 511 (e.g. phosphor particles) which are excited to generate lights of other color partially absorbed by the blue filter layer 600, the actual output light of other color is reduced in amount or intensity with respect to the incident blue light. In this embodiment, with the addition of diffusion particles 571 into the blue light unit 570, the actual output amount of blue light can be controlled to obtain the balance between the blue light and other color lights. However, in other embodiment, the color adjustment described above can be achieved by other manners. For example, the voltage applied to the liquid crystal layer can be controlled to respectively correspond to the color excitation units 570 and the blue light unit 570.

Figure 5:
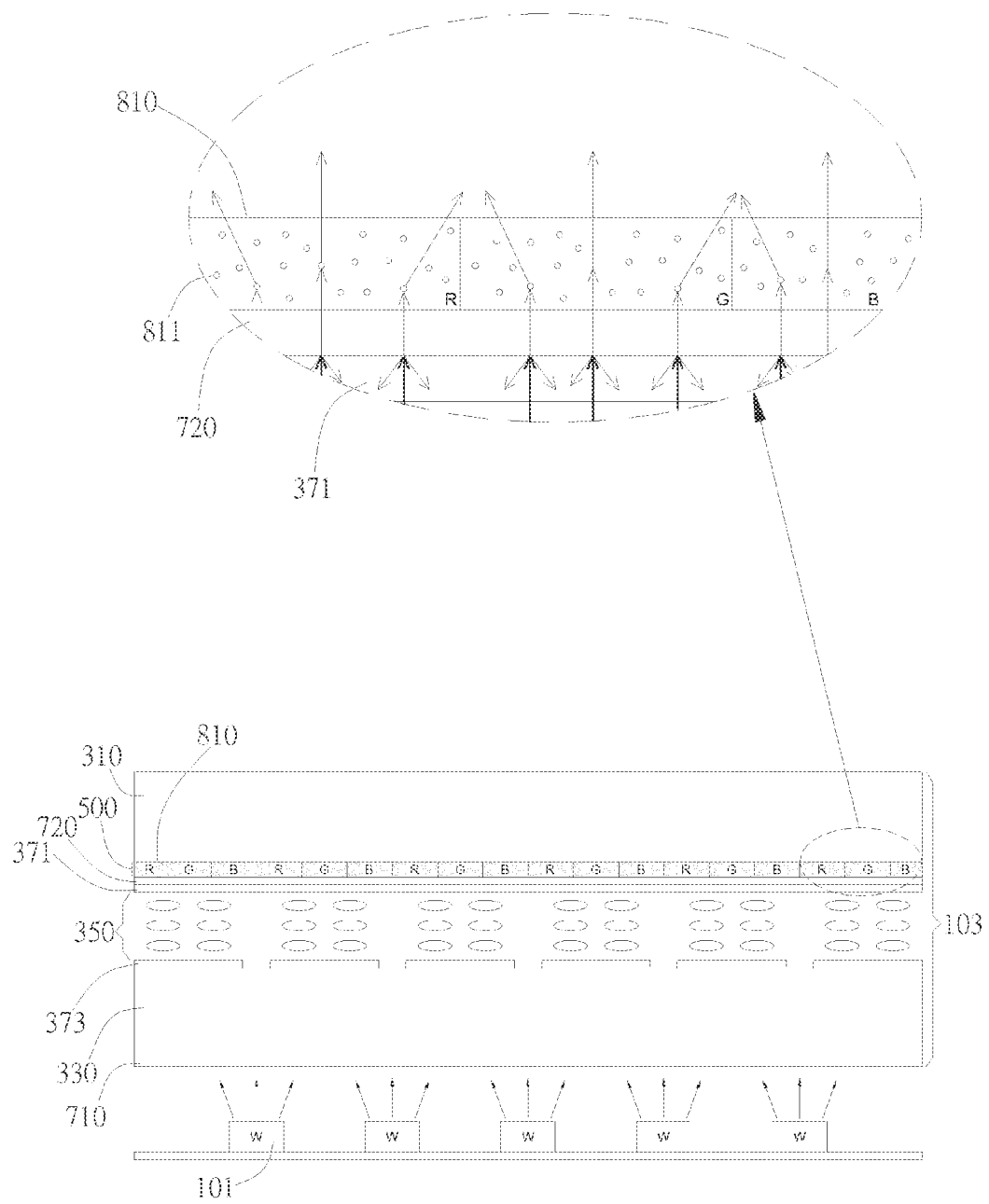
FIG. 5 is a schematic cross-sectional view of a display device in accordance with another embodiment of the present invention.

FIG. 5 illustrates another embodiment of the present invention. In this embodiment, the display device includes a light source 101 and a display panel 103 disposed on the light source 101. The light source 101 is preferably a white light source, such as white light emitting diode, cathode ray tube, etc. However, in cooperation with different elements, the light source 101 can be a blue light source. The display panel 103 consists of a first substrate 310, a second substrate 330, and a liquid crystal layer 350 sandwiched between the first substrate 310 and the second substrate 330. In this embodiment, the first substrate 310 is a substrate on the display side, and the second substrate 350 is a substrate on the light source side. A first polarizer layer 710 is disposed on the second substrate 330 facing the light source 101. However, in other embodiment, the first polarizer layer 710 is disposed on the second substrate opposite to the light source 101.

As shown in FIG. 5, a color adjusting layer 500 is disposed on the first substrate 310 facing the light source 101, and a second polarizer layer 720 is disposed on the color adjusting layer 500. The color adjusting layer 500 is preferably composed of a plurality of color modulation units 810. Each color modulation unit 810 includes a plurality of light scattering particles 811. In this embodiment, the color modulation unit 810 is composed of filter layers, such as red filter layer R, green filter layer G, and blue filter layer B. The filter layer allows light of a specific wavelength to pass therethrough and blocks light of other wavelengths. For example, the red filter layer allows only red light to pass therethrough and blocks other color light. Furthermore, in this embodiment, the light scattering particles 811 disposed within the filter layer are composed of diffusion particles, which are capable of altering the traveling path of the light passing through the filter layer to enhance the amount of output light at larger viewing angle. However, in other embodiment, the color modulation unit 810 can be the color excitation unit or the blue light unit described above, and the light scattering particles 811 of the color excitation unit can be phosphor particles, which also provide the light scattering effect.

As shown in FIG. 5, light emitted from the light source 101 reaches the color adjusting layer 500 after the amount of light being modulated by the first polarizer layer 710, the liquid crystal layer 350, and the polarizer layer 720. The red filter layer R, the green filer layer G, and the blue filter layer B of the color adjusting layer 500 respectively allow red light, green light, and blue light to pass therethrough and block other color light to display image. Furthermore, since the color adjusting layer 500 contains light scattering particles 811, part of the emitted red, green, and blue lights which have been reflected or refracted by the light scattering particles 811 emit out from different angle. Consequently, when viewing the display device from different angles, there is no significant difference in color image and brightness.

Figure 6:
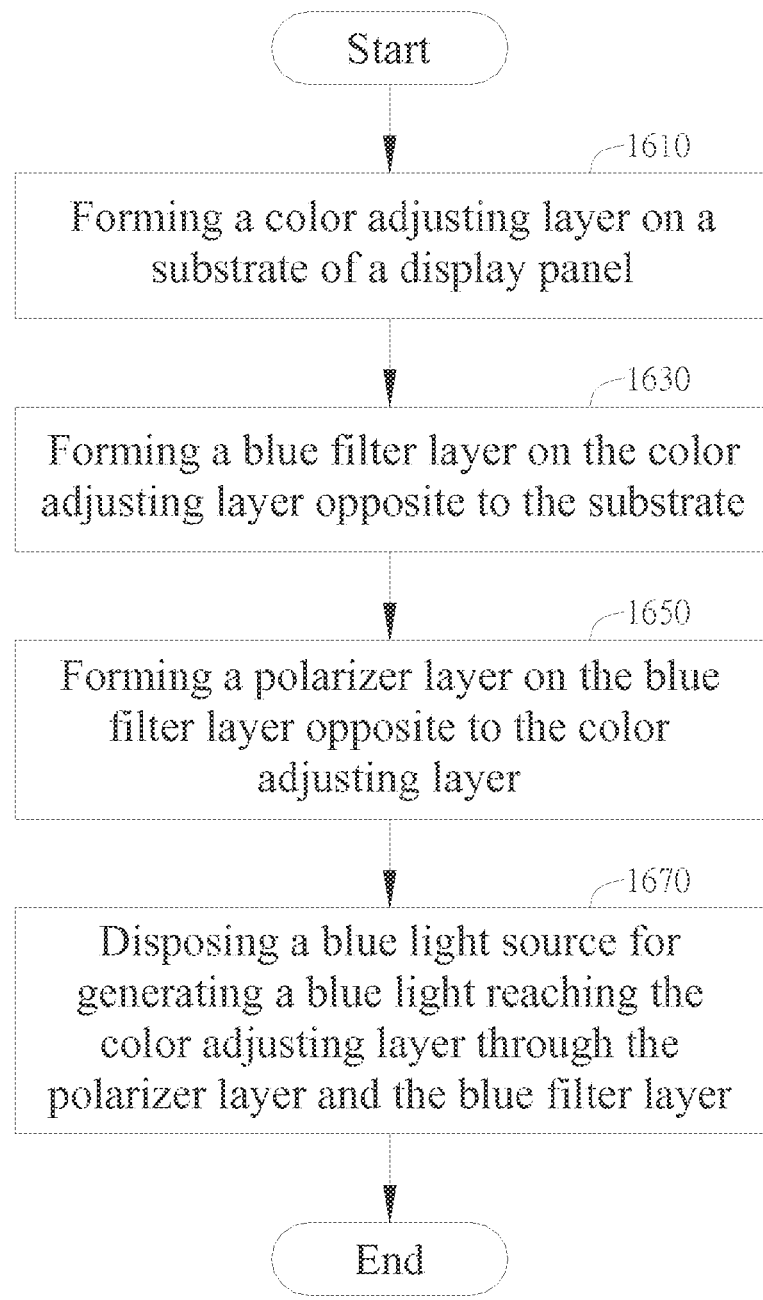
FIG. 6 is a flow chart of a manufacturing method of a display device in accordance with an embodiment of the present invention.

FIG. 6 illustrates a flow chart of a manufacturing method of the display device in accordance with one embodiment of the present invention. As shown in FIG. 6, step 1610 includes forming a color adjusting layer on a substrate of a display panel. For example, the color adjusting layer is formed on the inner side of the substrate, which is disposed on a display side of the display panel, i.e. the first substrate described above. In this embodiment, the disposition of the color adjusting layer includes forming color excitation units and blue light units on the substrate. In the process of forming the color excitation unit, wavelength transformation materials such as phosphor particles are first mixed into the material of the color excitation unit, and then the material containing phosphor particles are coated, printed, or sprayed onto the substrate and arranged according to color. The blue light unit can be arranged with the color excitation unit and formed on the substrate in a manner same as or different from that used in the color excitation unit. In a preferred embodiment, each blue light unit is grouped with one red light unit and one green light unit of the color excitation units to form a pixel unit.

Step 1630 includes forming a blue filter layer on the color adjusting layer opposite to the substrate. The blue filter layer allows blue light to pass therethrough and blocks other color lights (i.e. non-blue light). The blue filter layer 600 is a material containing Phthalocyanine pigment. However, in other embodiment, the blue filter layer 600 can be polymer, monomer, solvent, pigment, light initiator, etc. Moreover, the blue filter layer 600 is preferably formed on the color adjusting layer 500 by a single coating process, a deposition process, an ink injection process, a printing process, an etching process, a transfer process, an electrocoating process, or other processes as appropriate.

Step 1650 includes forming a polarizer layer (also referred as inner polarizer layer) on the blue filter layer opposite to the color adjusting layer. The polarizer layer can be adhered to or directly formed on the blue filter layer. Step 1670 includes disposing a blue light source for generating a blue light. The blue light source is preferably a blue light emitting diode, but not limited thereto. The blue light source can be other type of light emitting element capable of emitting blue light. In view of color adjustment, the blue light reaches the color adjusting layer through the polarizer layer and the blue filter layer. Part of the blue light enters the color excitation units of the color adjusting layer and excites the phosphor particles to generate non-blue light, and another part of the blue light is emitted out from the blue light unit. Part of the non-blue light generated from the excitation of the phosphor particles is emitted out from a direction opposite to the blue filter layer, and another part of the non-blue light is transmitted to and absorbed by the blue filter layer.

Figure 7:
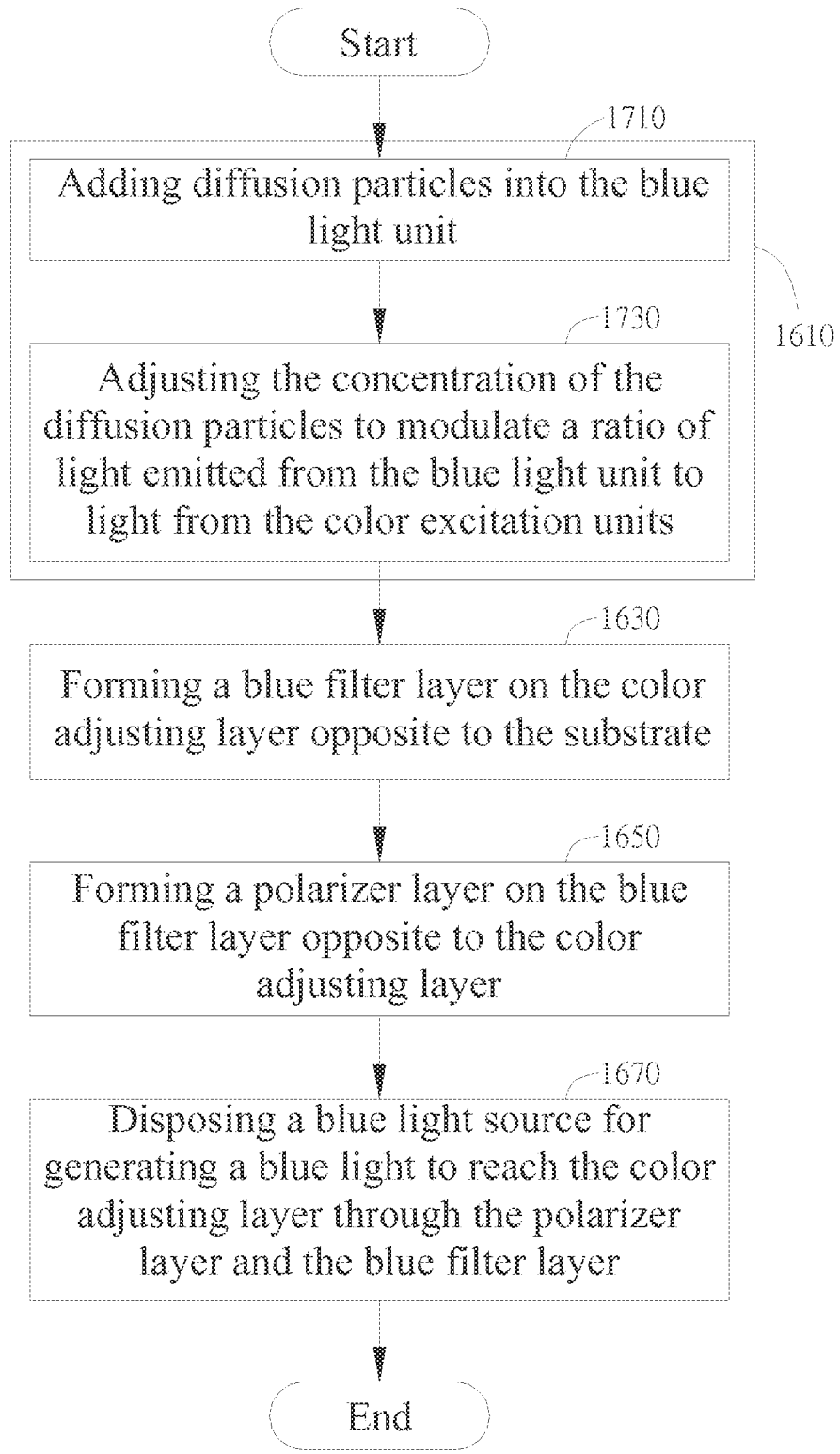
FIG. 7 is a flow chart of a manufacturing method of a display device in accordance with another embodiment of the present invention.

In the embodiment of FIG. 7, the step 1610 further includes step 1710 of adding diffusion particles into the blue light unit and step 1730 of adjusting the concentration of the diffusion particles to modulate a ratio of light emitted from the blue light unit to light from the color excitation units. Before the formation of the blue light unit, the diffusion particles are preferably mixed into the material of the blue light unit, and then the material containing the diffusion particles is formed on the inner side of the substrate by coating or other methods. Since the diffusion particles of the blue light unit and the phosphor particles of the color excitation unit will reduce the amount of emitted light, by adjusting the concentration of the diffusion particles can control the ratio of respective lights passing therethrough. Furthermore, in another embodiment, in order to adjust or balance the ratio of light from the blue light unit to light from the color excitation unit, the twist setting and the applied voltage of the liquid crystal layer can be controlled to achieve this purpose.

Figure 8:
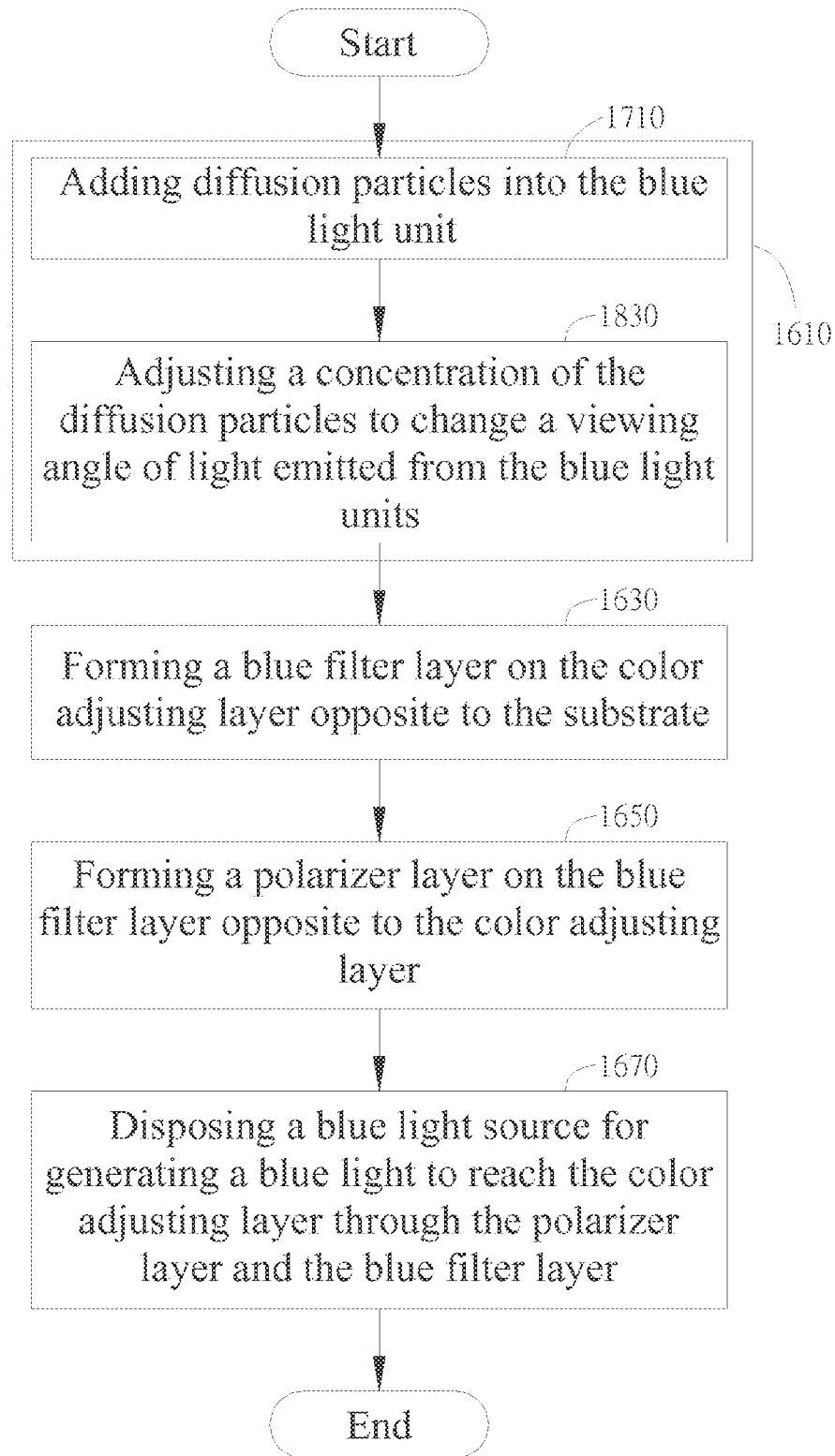
FIG. 8 is a flow chart of a manufacturing method of a display device in accordance with another embodiment of the present invention.

Compared to the embodiment of FIG. 7, in the embodiment of FIG. 8, step 1730 can be step 1830 of adjusting a concentration of the diffusion particles to change a viewing angle of light emitted from the blue light units. Since the light entering the blue light unit will be refracted or reflected by the diffusion particles to change the traveling path, in comparison with the original incident angle of the blue light, the light from the blue light unit is emitted out in a more scattered angle. That is, the light emitted form the blue light unit has a more uniform viewing angle distribution.

The present invention has been described through the relevant embodiments above; however, the embodiments above are only exemplary. What needs to point out is that the embodiments disclosed are not intended to limit the scope of the present invention. Contrarily, the modifications and the equivalents included in the spirit and scope of the claims are all included in the scope of this invention.

What is claimed is:
1. A display device, comprising:
   a blue light source; and
   a display panel disposed on the blue light source, wherein the display panel comprises:
      a substrate;
      a color adjusting layer formed on the substrate facing the blue light source, wherein the color adjusting layer comprises a plurality of color excitation units, each color excitation unit comprises a plurality of wavelength transformation materials;
      a blue filter layer formed on the color adjusting layer facing the blue light source, wherein the blue filter layer allows blue light to pass therethrough and absorbs non-blue light; and
      a polarizer layer formed on the blue filter layer facing the blue light source,
   wherein blue light emitted from the blue light source reaches the color adjusting layer through the polarizer layer and the blue filter layer, part of the blue light excites the wavelength transformation materials of the color excitation units to generate non-blue light, part of the non-blue light is transmitted to and absorbed by the blue filter layer to reduce the performance of non-blue color in the color adjusting layer.

2. The display device of claim 1, wherein the color adjusting layer further comprises a plurality of blue light units disposed side by side with the color excitation units, the blue light unit allows the blue light to pass therethrough.

3. The display device of claim 2, wherein the blue light unit comprises a plurality of diffusion particles for altering a traveling path of the blue light.

4. The display device of claim 1, wherein the color excitation units comprises a plurality of red units comprising a plurality of red phosphor particles and a plurality of green units comprising a plurality of green phosphor particles.

5. The display device of claim 1, wherein the blue filter layer comprises a phthalocyanine pigment.

6. A display device, comprising:
   a light source; and
   a display panel disposed on the light source, wherein the display panel comprises:
      a first substrate;
      a second substrate with a first polarizer layer formed thereon;
      a liquid crystal layer disposed on the second substrate opposite to the light source, wherein the first substrate is disposed on the second substrate opposite to the light source, and the liquid crystal layer is sandwiched between the first substrate and the second substrate;
      a color adjusting layer formed on the first substrate facing the liquid crystal layer, wherein the color adjusting layer comprises a plurality of color modulation units, each color modulation unit comprises a plurality of light scattering particles;
      a second polarizer layer formed on the color adjusting layer facing the liquid crystal layer; and
      a blue filter layer disposed between the color adjusting layer and the second polarizer layer, wherein the blue filter layer allows blue light to pass therethrough and absorbs non-blue light to reduce the impact on optical behavior of the liquid crystal layer,
   wherein light emitted from the light source reaches the color adjusting layer through the first polarizer layer, the liquid crystal layer, and the second polarizer layer, wherein the color adjusting layer adjusts color of the light and the light scattering particles change a traveling path of the light.

7. The display device of claim 6, wherein the color modulation units are composed of a plurality of filter layers, the light scattering particles are composed of a plurality of diffusion particles.

8. The display device of claim 7, wherein the filter layers comprise a plurality of red filter layers, a plurality of green filter layers, and a plurality of blue filter layers.

9. The display device of claim 6, wherein the color modulation units comprise a plurality of color excitation units and a plurality of blue light units, the light scattering particles of the color excitation units are composed of a plurality of phosphor particles, the light scattering particles of the blue light units are composed of a plurality of diffusion particles.

10. The display device of claim 9, further comprising a blue filter layer disposed between the color adjusting layer and the second polarizer layer, wherein the blue filter layer allows blue light to pass therethrough and absorbs non-blue light.

11. A manufacturing method of a display device, comprising:
    disposing a color adjusting layer on a substrate of a display panel, wherein the color adjusting layer comprises a plurality of color excitation units, each color excitation unit comprises a plurality of wavelength transformation materials;
    forming a blue filter layer on the color adjusting layer opposite to the substrate, wherein the blue filter layer allows blue light to pass therethrough and absorbs non-blue light;
    forming a polarizer layer on the blue filter layer opposite to the color adjusting layer, and
    disposing a blue light source for generating a blue light, wherein the blue light reaches the color adjusting layer through the polarizer layer and the blue filter layer, part of the blue light excites the wavelength transformation materials of the color excitation units to generate non-blue light, part of the non-blue light is transmitted to and absorbed by the blue filter layer to reduce the performance of non-blue color in the color adjusting layer.

12. The manufacturing method of claim 11, wherein the step of disposing the color adjusting layer comprises:
    forming a plurality of blue light units in the color adjusting layer, wherein the blue light units allow the blue light to pass therethrough; and
    adjusting a concentration of a plurality of diffusion particles in the blue light units to modulate a ratio of light emitted from the blue light unit to light from the color excitation units.

13. The manufacturing method of claim 11, wherein the step of disposing the color adjusting layer comprises:
    forming a plurality of blue light units in the color adjusting layer, wherein the blue light units allow the blue light to pass therethrough; and
    adjusting a concentration of a plurality of diffusion particles in the blue light units to change a viewing angle of light emitted from the blue light units.

14. The manufacturing method of claim 11, wherein the step of forming the blue filter layer comprises a process selected from the group consisting of an ink injection process, a printing process, an etch process, a transfer process, and a coating process.

15. A color adjusting method for use on a display device, comprising:
    generating a blue light to pass through a first polarizer layer, a liquid crystal layer, and a second polarizer layer;
    enabling the blue light emitted from the second polarizer layer to pass through a blue filter layer;
    enabling part of the blue light emitted from the blue filter layer to excite a plurality of wavelength transformation materials of a plurality of color excitation units in a color adjusting layer to generate non-blue light to reduce impact on optical behavior of the liquid crystal layer; and
    enabling the blue filter to absorb part of the non-blue light transmitted to the blue filter layer.

16. The color adjusting method of claim 15, further comprising enabling part of the blue light emitted from the blue filter layer to pass through the blue light units of the color adjusting layer to emit out the blue light.

17. The color adjusting method of claim 16, wherein the step of passing through the blue light units comprises disposing a plurality of diffusion particles in the blue light units to change a traveling path of the blue light.

18. The color adjusting method of claim 17, wherein the step of disposing the diffusion particles comprises adjusting a concentration of the diffusion particles to control a change amount of the traveling path of the blue light.

19. The color adjusting method of claim 17, wherein the step of disposing the diffusion particles comprises adjusting a concentration of the diffusion particles to modulate a ratio of light emitted from the blue light units to light emitted from the color excitation units.

* * * * *